United States Patent
Rivera et al.

[11] Patent Number: 5,841,082
[45] Date of Patent: Nov. 24, 1998

[54] SECONDARY GUIDANCE SYSTEM FOR LINEAR INDUCTION MOTORS DRIVING ELEVATOR CAR DOORS

[75] Inventors: James A. Rivera, Bristol; Michael J. Tracey, Cromwell, both of Conn.

[73] Assignee: Otis Elevator Company, Farmington, Conn.

[21] Appl. No.: 746,276

[22] Filed: Nov. 7, 1996

[51] Int. Cl.[6] .................................................. B66B 3/14
[52] U.S. Cl. .......................... 187/316; 187/289; 310/12
[58] Field of Search .................................. 187/316, 289; 310/12

[56] References Cited

U.S. PATENT DOCUMENTS

| | | | |
|---|---|---|---|
| 1,881,014 | 10/1932 | Ayers | 49/409 |
| 1,881,016 | 10/1932 | Rose | 49/350 |
| 1,881,017 | 10/1932 | Jacobson | 49/360 |
| 1,916,491 | 7/1933 | Rose | 49/118 |
| 2,940,550 | 6/1960 | Mathews | 188/74 |
| 3,971,537 | 7/1976 | Winkle et al. | 248/23 |
| 4,148,531 | 4/1979 | Hornagold | 308/3 R |
| 4,419,823 | 12/1983 | Thorban | 33/1 M |
| 4,698,876 | 10/1987 | Karita | 16/102 |
| 4,876,765 | 10/1989 | Karita | 16/102 |
| 5,086,881 | 2/1992 | Gagnon et al. | 187/17 |
| 5,134,324 | 7/1992 | Sakagami et al. | 310/12 |
| 5,172,518 | 12/1992 | Yoshino | 49/360 |
| 5,203,432 | 4/1993 | Grinaski | 187/94 |
| 5,373,120 | 12/1994 | Barrett et al. | 187/316 |
| 5,612,518 | 3/1997 | Jaminet et al. | 187/316 |

FOREIGN PATENT DOCUMENTS

| | | |
|---|---|---|
| 0142039 | 5/1985 | European Pat. Off. . |
| 0676359 | 10/1995 | European Pat. Off. . |
| 3602781 | 8/1996 | Germany . |
| 29613605U1 | 11/1996 | Germany . |
| 59-006768 | 1/1984 | Japan . |
| 541766 | 5/1977 | Russian Federation . |
| 2200060 | 7/1988 | United Kingdom . |

OTHER PUBLICATIONS

U.S. Patent Application Serial No. 8/225,024 filed Apr. 8, 1994 entitled "Linear Induction Motor Door Drive Assembly for Elevators"; Jerome F. Jaminet, et al.
EPC Search Report for Serial No. 97308733.1–2313 dated Feb. 12, 1998.
European Search Report for Serial No. 97308721.6–2313 dated Feb. 3, 1998.

*Primary Examiner*—Robert E. Nappi

[57] ABSTRACT

A motor secondary in a linear induction motor used for opening and closing doors in an elevator system includes a secondary guide system having a first secondary guide and a second secondary guide. The first secondary guide is disposed on a bottom longitudinal edge of the motor secondary and the second secondary guide is disposed on a top longitudinal edge of the motor secondary. The guides space apart the motor secondary from the motor primary and establish small and constant running clearances therebetween.

10 Claims, 3 Drawing Sheets

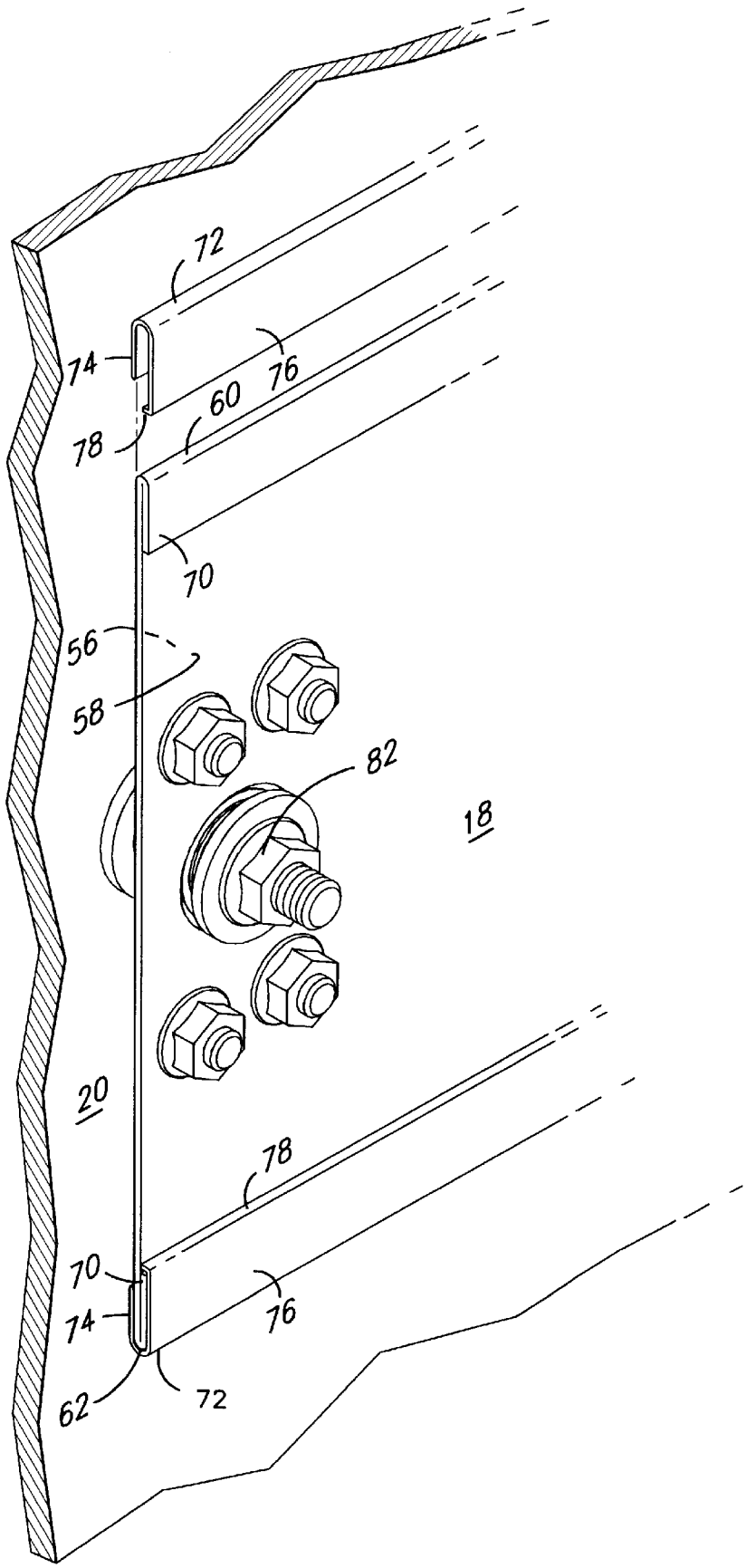

SECONDARY GUIDANCE SYSTEM FOR LINEAR INDUCTION MOTORS DRIVING ELEVATOR CAR DOORS

CROSS-REFERENCE TO RELATED APPLICATIONS

This application is related to commonly owned co-pending applications filed on the same day herewith having Ser. Nos 08/746,275 and 08/746,281.

TECHNICAL FIELD

The present invention relates to elevator systems and, more particularly, to high performance linear induction motors driving elevator car doors therefor.

BACKGROUND OF THE INVENTION

In conventional elevator systems, elevator car doors are selectively opened and closed by a rotary electric motor driving a mechanical assembly, which typically includes a plurality of moving parts such as gear boxes, a set of drive arms, and linkages. The major drawback of existing elevator car door systems is their susceptibility to misalignments which require frequent adjustments, resulting in high maintenance costs. Also, the misalignments degrade the performance of the system such that the door opening and closing functions are not consistently sm ooth and not always quiet.

Linear motors potentially can provide an alternative to conventional door operating systems by eliminating the mechanical linkages and problems associated therewith. However, despite the fact that the use of linear motors on door systems has been disclosed in various patents, including U.S. Pat. No. 1,881,014 to Ayers and U.S. Pat. No. 5,172,518 to Yoshino, none of the references provide a practical door operating system for the elevator industry. Typically, linear motors include a motor primary and a motor secondary that cooperate to generate thrust forces to selectively open and close elevator car doors. One problem hindering the implementation of linear motors on elevator car doors in the elevator industry is maintaining proper running clearances between the motor primary and the motor secondary of the linear motor. For efficient and high performance of linear motors, running clearances must remain constant and small during various modes of door operation. Fluctuations in the running clearance during operation of the door system will cause a change in the thrust of the motor and potentially can result in erratic motion of the doors. It is even more difficult to maintain constant and small running clearances between parts of the linear motor when the elevator car doors become misaligned or impacted. However, it is imperative to maintain small and constant running clearances between the motor primary and the motor secondary, even when elevator car doors deviate from the intended path.

The majority of the existing references disclosing use of linear motors on elevator car doors rely primarily on guidance systems between parts of the motor that include rollers. Although use of rollers in guidance systems is common, roller type guidance systems introduce many undesirable side effects and include many limitations. The undesirable side effects include generation of noise, high point concentration of loads caused by attracting forces, and transmission of vibrations from the motor. One of the primary limitations of roller type guidance systems is that during any type of misalignment or relative motion between the motor primary and the motor secondary, the rollers do not allow deviant movement and may skid.

U.S. Pat. No. 1,881,016 to Rose issued on Oct. 4, 1932, and entitled "Door Operating Mechanism" shows a motor secondary provided with a pair of shoes on the upper and lower edges thereof. The shoes are rigidly constrained within a guideway. Although the Rose patent eliminates many downsides of the roller guidance systems, it still does not allow for any door misalignment in the vertical direction and would result in a jam when a door is misaligned or twisted. Therefore, it is desirable to provide a guidance system between a motor primary and a motor secondary that would compensate for door misalignment and that would still maintain a small, constant running clearance between the motor primary and the motor secondary.

DISCLOSURE OF THE INVENTION

It is an object of the present invention to establish a constant and minimal running clearance between a motor secondary and a motor primary of a linear induction motor.

It is another object of the present invention to provide a linear induction motor for driving an elevator car door system that is not sensitive to vertical misalignment of the elevator car doors.

According to the present invention, a motor secondary of a linear induction motor used for opening and closing elevator car doors includes a secondary guide system having a first secondary guide disposed on an upper longitudinal edge and a second secondary guide disposed on a lower longitudinal edge of the motor secondary that together establish the running clearances between the motor secondary and motor primary. The secondary guides extend the length of the motor secondary and ride on a surface of a backiron on one side and on a surface of the motor primary on the other side.

The secondary guides establish small running clearances between the motor secondary and the motor primary, which are maintained throughout all operational modes of the elevator car doors. The secondary guides of the present invention also allow vertical movement of the motor secondary relative to the motor primary, thereby allowing and compensating for possible elevator car door misalignment and twisting.

One advantage of the present invention is that the secondary guides do not generate noise.

Another advantage of the present invention is that the repelling force is distributed along the entire surface of each guide and provides a greater wearing surface, and therefore does not sustain extensive wear.

The foregoing and other advantages of the present invention become more apparent in light of the following detailed description of the exemplary embodiments thereof, as illustrated in the accompanying drawings.

BRIEF DESCRIPTION OF THE DRAWINGS

FIG. 3 is an enlarged, exploded, fragmentary, perspective view of the motor secondary fitted with the secondary guides of FIG. 2.

BEST MODE FOR CARRYING OUT THE INVENTION

Figure 1:
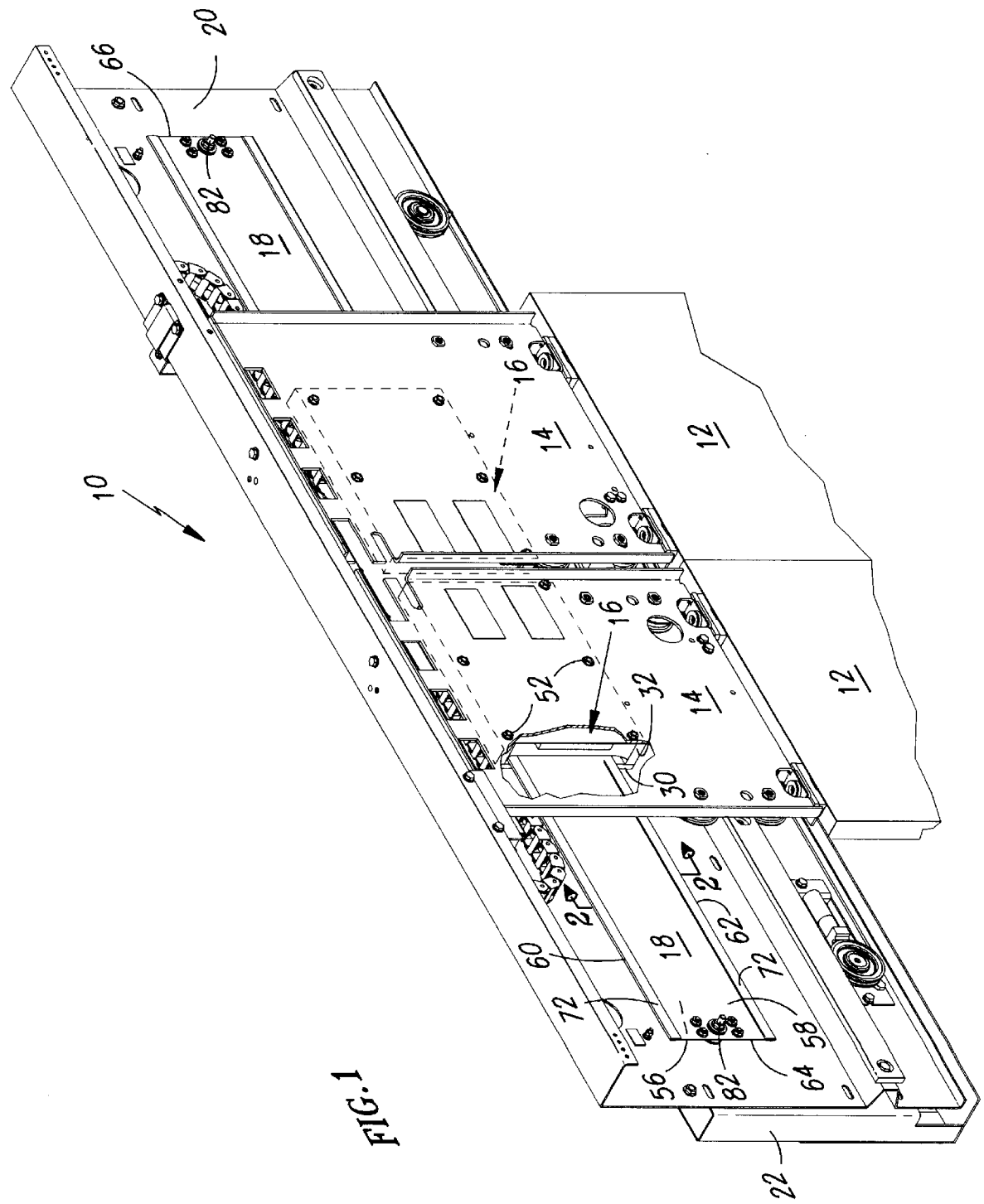
FIG. 1 is a partially cut-away, schematic, perspective view of an elevator door system driven by a linear induction motor including a motor primary and motor secondary fitted with secondary guides, according to the present invention.

Referring to FIG. 1, an elevator car door operating system 10 for opening and closing a pair of elevator car doors 12 that are suspended from a pair of door hangers 14 includes a pair of motor primaries 16 fixedly attached to the pair of door hangers and a motor secondary 18 attached to a header bracket 20 secured to a car facia 22 of an elevator car (not shown).

Figure 2:
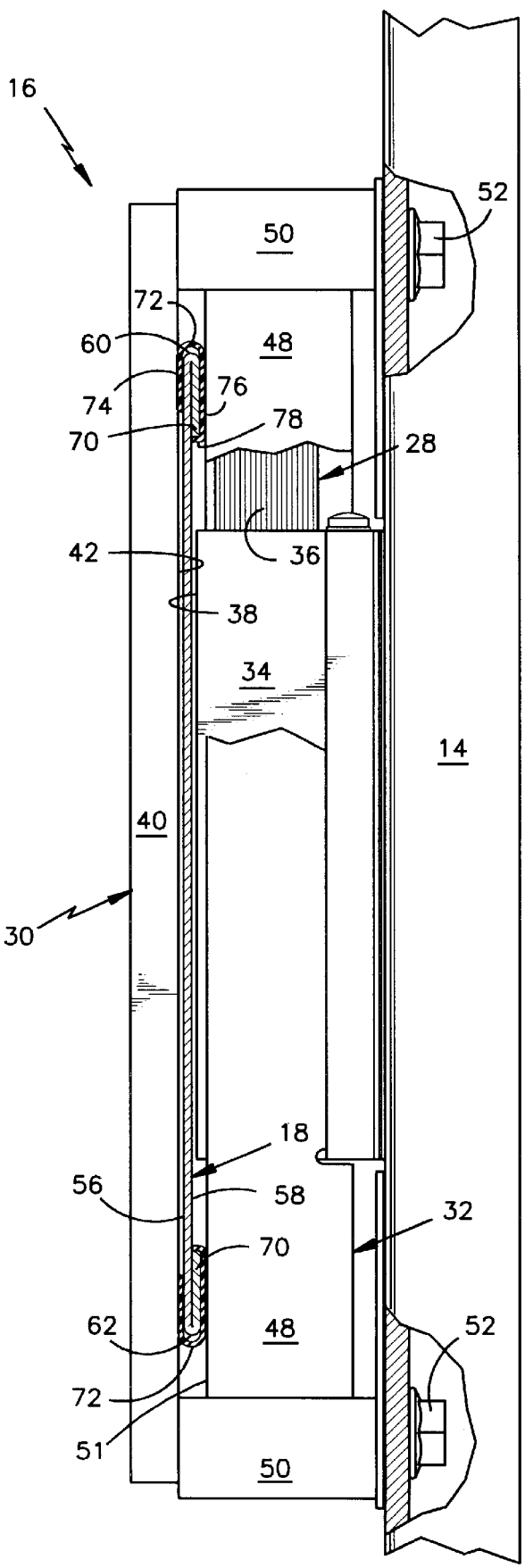
FIG. 2 is a partially cut-away, schematic, cross-sectional view of the linear induction motor of FIG. 1 taken along the line 2—2.

Referring to FIG. 2, each of the motor primaries 16 includes a primary winding 28 and a backiron 30 spaced apart from each other by a plurality of motor spacers 32. The primary winding 28 includes a primary iron unit 34 with windings 36 wrapped around it and a primary surface 38 facing the backiron 30. The backiron 30 includes an iron plate 40 having a backiron surface 42 facing the primary winding 28. A magnetic air gap is defined between the primary surface 38 and the backiron surface 42.

Each spacer 32 includes a spacer bar 48 framed by a spacer head 50 on each end thereof. Each spacer head 50 fixes spacing between the primary winding 28 and the backiron 30. The spacer bar 48 includes a spacer surface 51 and is adapted to clamp the primary winding 28 against the door hanger 14. Each motor primary 16 is fixedly attached to the door hangers 14 by means of a plurality of bolts 52 passing through the backiron 30 and the motor spacer heads 50.

The motor secondary 18 extends the length of the door travel car and fits between the backiron 30 and the primary winding 28 as the motor primaries 16 travel across, opening and closing the elevator car doors 12, as best seen in FIG. 1. The motor secondary 18 comprises a substantially flat plate having a first and a second faces 56, 58 bounded by a top and a bottom longitudinal edges 60, 62 extending the length of the motor secondary, and by a first and second vertical ends 64, 66. Both longitudinal edges 60, 62 are bent over to form a lip 70 along the length of the second face 58 of the motor secondary 18, as best seen in FIGS. 2 and 3.

Referring to FIG. 3, a secondary guide 72 is placed over each longitudinal edge 60, 62 of the motor secondary 18. The secondary guide 72 has an elongated U-shaped body, the internal width of which is equal to the width of the doubled over edge 60, 62 of the motor secondary. The U-shaped body includes a first leg 74 and a second leg 76 with the second leg 76 having vertical height substantially equal to the height of the bent over lip 70. The second leg also includes a tab 78 integrally formed at the end thereof. The secondary guide 72 is snapped onto each edge 60, 62 of the motor secondary 18 with the tab 78 fitting over the bent over lip 70 and securing the secondary guide 72 onto the motor secondary 18.

Referring to FIG. 2, the outside surface of the first leg 74 of the secondary guide 72 comes in contact with the backiron surface 42. The outside surface of the second leg 76 of the secondary guide 72 comes in contact with the spacer surface 51 of the spacer bars 32. Each spacer is dimensioned so that a running clearance is defined between the second face 58 of the motor secondary 18 and the primary surface 38. The spacer surface 51 of the spacer bar 32 is indented from the plane of the primary surface 38 of the motor primary 16 to compensate for the thickness of the lip 70 of the motor secondary 18. Therefore, the running clearances between the backiron surface 42 and the first face 56 of the motor secondary and between the primary surface 38 and the second face 58 of the motor secondary equal the thickness of the first and second legs 74, 76 of the secondary guide, respectively.

The motor secondary 18 is movably attached to the header bracket 20 at two ends 64, 62 thereof, as best seen in FIG. 1. The motor secondary 18 is mounted to the header bracket 20 by means of a joint 82 functioning as a standoff to allow the backiron to travel between the header bracket and the motor secondary. The joint 82 also includes a swivel allowing the motor secondary to move in and out of plane and to rotate about the joint 82.

In operation, as the motor primaries 16 move across the motor secondary 18, opening and closing elevator car doors 12, the running clearances between the backiron 30 and the motor secondary 18 and between the motor secondary 18 and the primary winding 28 are maintained constant and small. The secondary guides 72 establish a predetermined spacing by holding the flat surfaces of the backiron 42 and the primary surface 38 of the primary winding 28 away from the motor secondary 18. As the motor primaries 16 move across the motor secondary 18, the secondary guides 72 come in contact with the backiron surface 42 on one side and with the spacer surface 51 on the other side. Thus, the secondary guides 72 space apart the first and second secondary motor surfaces 56, 58 from the backiron surface 42 and primary surface 38, respectively. The contact between the secondary guides 72 and the backiron surface 42 and the spacer surface 51 remains steady throughout all modes of operation because the distance between the backiron surface and the spacer surface has been fixed by the spacer heads.

It is critical to maintain running clearances between the motor secondary 18 and the motor primary 16 to avoid friction therebetween. However, it is imperative to keep these running clearances to a minimum so that the magnetic air gap remains small. Larger magnetic air gaps reduce motor efficiency.

A major advantage of the secondary guides 72 of the present invention over the prior art is an ability to allow and compensate for vertical movement of the motor primary 16 relative to motor secondary 18. In the instances when the elevator car doors 12 are either impacted or misaligned and the door hangers 14 with the motor primaries 16 thereon are displaced vertically, the running clearances are not changed and the performance of the motor and consequently of the doors is not affected. This goal is achieved by providing the specific configuration shown herein and by dimensioning the motor secondary 18 to have additional vertical space to move in. Since the backiron surface 42 and the spacer bar surfaces 51 are substantially flat, when the motor primary 16 moves vertically relative to motor secondary 18, the secondary guides 72 still maintain constant running clearances, regardless of the vertical position of the motor secondary 18 to the motor primary 16.

One benefit of the present invention is that the secondary guides 72 are snapped on the motor secondary 18 and do not require time consuming and complicated assembly. Also, the secondary guides do not require subsequent readjustment. Another benefit of the secondary guides is that only minimal wear is experienced. An additional benefit of the present invention is that it does not generate noise.

The secondary guides are fabricated from a high density polymer. Although a variety of high density polymers are acceptable, such as Acetron, UHMW and Nylatron, the lengthy research and testing proved Nylatron to be the best. The thickness of each leg 74, 76 of the secondary guide 72 in the best mode embodiment is approximately one millimeter (1 mm). However, the thickness of the guide 72 can vary depending on the size of the desired running clearance.

While the present invention has been illustrated and described with respect to a particular embodiment thereof, it should be appreciated by those of ordinary skill in the art, that various modifications to this invention may be made without departing from the spirit and scope of the present invention. For example, although the best mode embodiment describes a single secondary guide for each longitudinal edge, a plurality of shorter secondary guides may be placed onto each longitudinal edge adjacent to each other.

We claim:

1. A linear motor for opening and closing an elevator car door of an elevator car, said elevator car door being suspended from a door hanger, said door hanger being movably secured onto a header bracket fixedly attaching onto said elevator car, said linear motor comprising:

a motor primary secured to said door hanger and having a backiron and a primary winding spaced apart by a plurality of spacers;

a motor secondary attaching onto said header bracket and fitting between said backiron and said primary winding of said motor primary, said motor secondary having a top longitudinal edge and a bottom longitudinal edge extending the length of said motor secondary, said motor secondary having a first vertical end and a second vertical end;

a top secondary guide extending the length of said motor secondary and fitting over said top longitudinal edge; and a bottom secondary guide extending the length of said motor secondary and fitting over said bottom longitudinal edge, said first and second secondary guides allowing vertical movement of said motor primary relative to said motor secondary.

2. The linear motor according to claim 1 wherein said secondary guide having a U-shaped body.

3. The linear motor according to claim 2 wherein:

said motor secondary includes a first and a second face, said motor secondary having a top and bottom lip bent over on said second face thereof, said lip extending the length of said motor secondary; and said U-shaped body of said secondary guide having a first leg and a second leg, said second leg extending the height of said lip and having a tab integrally formed on the end thereof so that said secondary guide can be snapped onto said longitudinal edges of said motor secondary.

4. The linear motor according to claim 1 wherein said secondary guides are fabricated from Nylatron.

5. An elevator car door operating system for opening and closing an elevator car door including a motor primary and a motor secondary cooperatingly moving past each other to generate thrust to open and close said elevator car door, said elevator car door operating system characterized by:

a secondary guide system having a first and a second secondary guides, said first and second secondary guides establishing a running clearance between said motor primary and said motor secondary and allowing vertical movement between said motor primary and said motor secondary.

6. The elevator car door operating system according to claim 5 wherein said first and second secondary guides are fabricated from Nylatron.

7. A secondary guide system for spacing apart a motor secondary from a motor primary in a linear motor used for driving elevator car doors in an elevator system, said secondary guide system comprising:

a plurality of secondary guides extending the length of said motor secondary and placed on a top and a bottom longitudinal edges of said motor secondary, said plurality of secondary guides spacing said motor secondary from said motor primary and allowing vertical movement of said motor primary relative to said motor secondary.

8. A linear motor for opening and closing an elevator car door of an elevator car, said elevator car door being suspended from a door hanger, said door hanger being movably secured by a header bracket fixedly attached to said elevator car, said linear motor comprising:

a motor primary secured to said door hanger and having a backiron and a primary winding spaced apart by a plurality of spacers;

a motor secondary attaching onto said header bracket and fitting between said backiron and said primary winding of said motor primary, said motor secondary having a top longitudinal edge and a bottom longitudinal edge extending the length of said motor secondary, said motor secondary having a first vertical end and a second vertical end;

a top secondary guide extending the length of said motor secondary and fitting over said top longitudinal edge; and a bottom secondary guide extending the length of said motor secondary and fitting over said bottom longitudinal edge, said first and second secondary guides separating said secondary from said primary winding and from said backiron while allowing vertical movement of said motor primary relative to said motor secondary.

9. An elevator car door operating system for opening and closing an elevator car door including a motor primary and a motor secondary cooperatingly moving past each other to generate thrust to open and close said elevator car door, said elevator car door operating system characterized by:

a secondary guide system having first and second secondary guides, said first and second secondary guides lying between and thereby establishing a running clearance between said motor primary and said motor secondary and allowing vertical movement between said motor primary and said motor secondary.

10. A secondary guide system for spacing apart a motor secondary from a motor primary in a linear motor used for driving elevator car doors in an elevator system, said secondary guide system comprising:

a plurality of secondary guides extending the length of said motor secondary and placed on a top longitudinal edge and a bottom longitudinal edge of said motor secondary, said plurality of secondary guides lying between and spacing said motor secondary from said motor primary and allowing vertical movement of said motor primary relative to said motor secondary.

\* \* \* \* \*